(12) United States Patent
Whelan et al.

(10) Patent No.: US 7,734,943 B2
(45) Date of Patent: Jun. 8, 2010

(54) LOW POWER DISPLAY REFRESH

(75) Inventors: Rochelle J. Whelan, Portland, OR (US); Marcus Grindstaff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1162 days.

(21) Appl. No.: 10/407,758

(22) Filed: Apr. 3, 2003

(65) Prior Publication Data

US 2004/0199798 A1 Oct. 7, 2004

(51) Int. Cl.
*G06F 1/32* (2006.01)

(52) U.S. Cl. ...................... 713/324; 713/320
(58) Field of Classification Search .......... 713/300–375
See application file for complete search history.

(56) References Cited

U.S. PATENT DOCUMENTS

| | | | |
|---|---|---|---|
| 5,548,765 A * | 8/1996 | Tsunoda et al. ............. 713/322 |
| 5,860,016 A * | 1/1999 | Nookala et al. ............. 713/324 |
| 5,867,140 A | 2/1999 | Rader |
| 6,035,408 A * | 3/2000 | Huang ........................ 713/320 |
| 6,240,521 B1 * | 5/2001 | Barber et al. ............... 713/323 |
| 6,624,816 B1 * | 9/2003 | Jones, Jr. .................... 345/503 |
| 6,680,738 B1 * | 1/2004 | Ishii et al. ................... 345/568 |
| 6,832,269 B2 * | 12/2004 | Huang et al. ................. 710/11 |
| 6,877,098 B1 * | 4/2005 | Lavelle et al. ............... 713/320 |
| 6,992,675 B2 * | 1/2006 | Aleksic et al. .............. 345/555 |
| 7,042,459 B2 * | 5/2006 | Sauber ....................... 345/520 |
| 2001/0050431 A1 * | 12/2001 | Naitoh et al. ............... 257/733 |
| 2002/0126108 A1 | 9/2002 | Koyama et al. |
| 2003/0045245 A1 | 3/2003 | Hikishima |

* cited by examiner

*Primary Examiner*—Thomas Lee
*Assistant Examiner*—Paul B Yanchus, III
(74) *Attorney, Agent, or Firm*—Kacvinsky LLC

(57) ABSTRACT

An application processor coupled to a Static Random Access Memory (SRAM) interfaces with a graphics accelerator. A Dynamic Random Access Memory (DRAM) stores frame buffer data that may be transferred to a display through a switch located on the graphics accelerator in normal operation. In a power savings mode, the DRAM may be powered down and a copied frame buffer data stored in the SRAM may be transferred to the display through the switch.

8 Claims, 2 Drawing Sheets

LOW POWER DISPLAY REFRESH

Low power consumption, small size, light weight, and low cost have been primary requirements for the development of mobile devices such as portable telephones. These wireless communications devices incorporate transceivers to modulate the high frequency signal received by the antenna to a baseband frequency, where the receiver of the mobile phone selectively extracts the signal it needs. The digital information is extracted from the selected signal and with further digital processing, the output is then delivered in the form of clear speech.

To aid the mobile phone in delivering communications data, companion chips to the digital processor aid with the graphics and multimedia data. These companion chips process graphics and multimedia data efficiently and at lower power than the digital processor.

Accordingly, there is a continuing need for better ways to provide filtering in the frequency translation process while providing flexibility for operating a high data-rate wireless transceiver.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
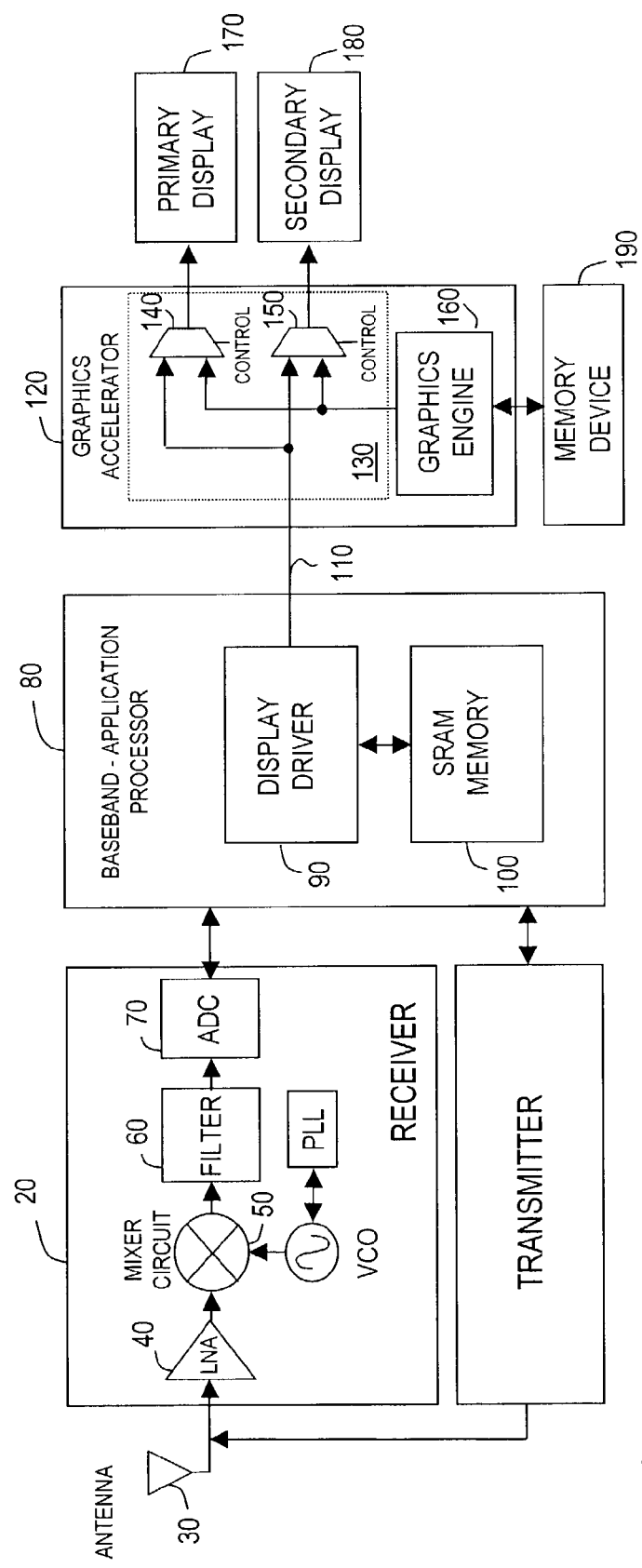
FIG. 1 illustrates features of the present invention for a display refresh that may be incorporated in a wireless communications device.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates features of the present invention for a display refresh that may be incorporated in a wireless communications device 10. The transceiver for wireless communications device 10 either receives or transmits a modulated signal from an antenna 30. A Low Noise Amplifier (LNA) 40 amplifies the received signal and a mixer circuit 50 translates the carrier frequency of the modulated signal, up-converting the frequency of the modulated signal in the transmitter and down-converting the frequency of the modulated signal in the receiver. The down-converted signal may be filtered through a filter 60 and converted to a digital representation by an Analog-To-Digital Converter (ADC) 70. A baseband and application processor 80 is connected to the transceiver to provide, in general, the digital processing of the received data within communications device 10.

The transceiver may be embedded with processor 80 as a mixed-mode integrated circuit, or alternatively, the analog circuitry may be a stand-alone Radio Frequency (RF) integrated circuit. Accordingly, embodiments of the present invention may be used in a variety of applications, with the claimed subject matter incorporated into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in smart phones, communicators, tablets and Personal Digital Assistants (PDAs), baseband and application processors, medical or biotech equipment, automotive safety and protective equipment, and automotive infotainment products. However, it should be understood that the scope of the present invention is not limited to these examples.

Further, the principles of the present invention may be practiced in wireless devices that are connected in a Code Division Multiple Access (CDMA) cellular network and distributed within an area for providing cell coverage for wireless communication. Additionally, the principles of the present invention may be practiced in Wireless Local Area Network (WLAN), 802.11, Orthogonal Frequency Division Multiplexing (OFDM), Ultra Wide Band (UWB), and Global System for Mobile Communications (GSM), among others.

A display driver 90 may reside in baseband and application processor 80, providing data across an interface 110 to a graphics accelerator 120. A memory 100 may be connected to display driver 90 to store data used to refresh a display. In some embodiments, memory 100 may be a volatile memory such as, for example, a Static Random Access Memory (SRAM), although the scope of the claimed subject matter is not limited in this respect. Further, although memory 100 is shown as an SRAM on-die memory, in some embodiments the memory may be off-die and external to processor 80.

Graphics engine 160 may receive data across interface 110 that is supplied to an input of a multiplexer 140, with the other input of the multiplexer receiving data from a graphics engine 160. The output of multiplexer 140 may be connected to a primary display 170. A second multiplexer, i.e., multiplexer 150, may also receive data across interface 110, with the other input of the multiplexer receiving data from graphics engine 160. The output of multiplexer 150 may be connected to a secondary display 180. Collectively, multiplexers 140 and 150 may be referred to as a switch 130 and, in case where displays 170 and 180 are Liquid Crystal Displays (LCDs), the switch may be referred to as an LCD switch 130.

A memory 190 may be connected to graphics engine 160 and be a volatile memory such as, for example, a Dynamic Random Access Memory (DRAM) or a Synchronous Dynamic Random Access Memory (SDRAM). Alternatively, memory 190 may be a nonvolatile memory such as, for example, a Ferroelectric Random Access Memory (FRAM), a Polymer Ferroelectric Random Access Memory (PFRAM), a Magnetic Random Access Memory (MRAM), an Ovonics Unified Memory (OUM), or any other device capable of storing data. However, it should be understood that the scope of the present invention is not limited to these examples.

When baseband-application processor 80 operates in a normal operating mode (e.g. not a "refresh only" mode), the frame buffer is maintained or stored in DRAM memory 190 that is connected to graphics accelerator 120. A frame buffer is the video memory that holds the pixels from which the video display (frame) is refreshed. A "dumb" or unaccelerated frame buffer performs no real action other than to provide a video signal to a monitor, while a "smart" frame buffer includes additional hardware and/or microcode to accelerate 2D and 3D graphics. Note that the control of multiplexers 140 and 150 allows a path to be selected where frame buffer data is received from memory 190 and passed to displays 170 and 180.

On the other hand, when baseband-application processor 80 operates in a "refresh only" mode, features of the present invention provide a low-power display refresh method that uses memory 100 on application processor 80 to refresh display 170 and/or display 180. First, the frame buffer data is copied from DRAM memory 190 for storage in memory 100 on applications processor 80. Next, DRAM memory 190 is put into a self-refresh mode or other low power mode (that may include removing power) where the memory consumes very low power. Then the control of multiplexers 140 and 150 allows selection of the path where frame buffer data from memory 100 is passed to displays 170 and 180. By way of example, a 256 kB on-die SRAM memory 100 may refresh display 170 and/or display 180 using data supplied through local LCD interface 110, through multiplexers 140 and 150 to display 170 and/or display 180.

Even though display 170 and/or display 180 are attached to the graphics accelerator 120, using features of the present invention applications processor 80 may refresh the displays using the LCD switch 130 (multiplexers 140 and 150) integrated for dual-display support. After the frame buffer data is copied from DRAM memory 190 for storage in memory 100, multiplexers 140 and 150 are switched so that applications processor 80 uses SRAM memory 100 to drive display 170 and/or display 180 through graphics accelerator 120. This allows refresh out of the applications processor's memory 100 without having DRAM memory 190 fully powered up, providing reduced system operating power. In a "refresh only" mode most of graphics accelerator 120 may be powered off or the clocks may be stopped to further reduce the system operating power.

Figure 2:
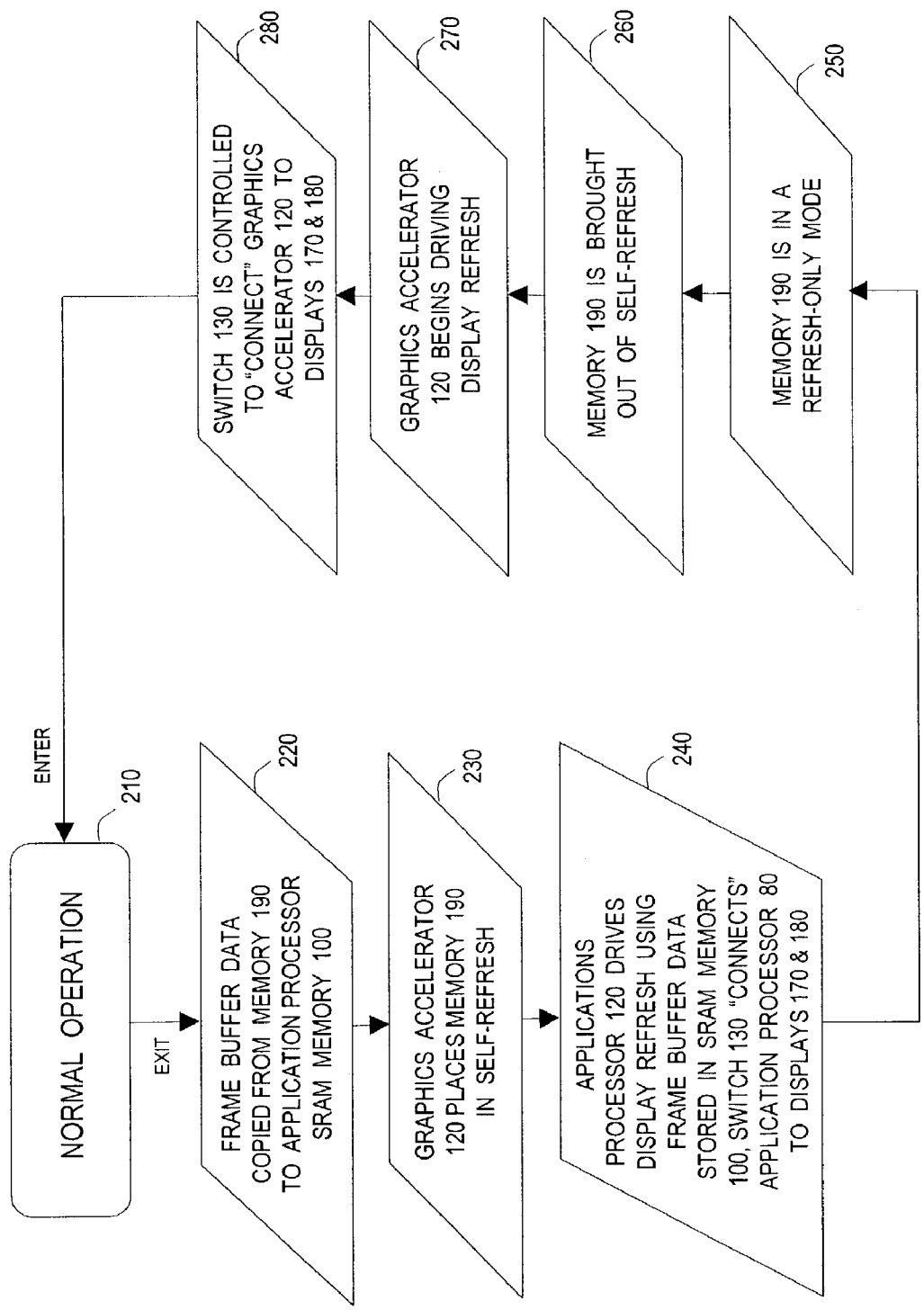
FIG. 2 is a flow diagram that illustrates the process for a refresh-only entry and exit in accordance with the present invention.

FIG. 2 is a flow diagram that illustrates the process for a system refresh-only entry and exit in accordance with the present invention. From a normal operation (Process 210) where display 170 and/or display 180 receive the frame buffer data from memory 190, the frame buffer data may be copied from memory 190 to SRAM memory 100 in application processor 80 (Process 220). The copied data provides a static image as opposed to a changing image. With the static image now residing in memory 100, memory 190 may be placed in self-refresh or other low power state that may include removing power (Process 230). Switch-130 is controlled to now select the copied frame buffer that is stored in SRAM memory 100 (Process 240) to refresh display 170 and/or display 180. In the embodiment where memory 190 is a DRAM, this memory must be refreshed, and therefore, the memory resides in a refresh-only mode (Process 250). In Process 260, memory 190 is brought out of self-refresh and graphics accelerator 120 again drives display refresh using the frame buffer data in memory 190 (Process 270) by controlling switch 130 (Process 280).

By now it should be appreciated that a method and circuitry have been presented to reduce power in a sleep mode or in a power conservation state. In at least one embodiment, the method includes copying frame buffer data from a DRAM memory to an SRAM memory. The DRAM memory may be placed in a refresh-only mode with graphics data being retrieved from the SRAM memory. With the graphics data being a static image, additional processing by the processor may not be needed, and therefore, the system may be placed in a sleep mode.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:
using a first display driver coupled to a graphics accelerator operating in a normal mode to supply frame buffer data from an external memory to a display;
copying the frame buffer data stored in the external memory to a memory embedded with a processor;
powering down the external memory and the first display driver in a power savings mode; and
refreshing the display using a second display driver to supply the copied frame buffer data stored in the memory embedded with the processor.

2. The method of claim 1, further comprising:
setting a switch in the graphics accelerator to change refreshing the display using the frame buffer data stored in the memory coupled to the graphics accelerator to using the copied frame buffer data stored in the memory coupled to the processor.

3. The method of claim 2 further comprising:
powering up the memory coupled to the graphics accelerator; and
setting the switch in the graphics accelerator to change refreshing the display using the copied frame buffer data stored in the memory coupled to the processor to using the frame buffer data stored in the memory coupled to the graphics accelerator.

4. The method of claim 1 wherein refreshing a display further comprises refreshing a Liquid Crystal Display (LCD).

5. The method of claim 1 wherein a memory coupled to the graphics accelerator includes coupling a Dynamic Random Access Memory (DRAM) to the graphics accelerator and a memory coupled to the processor includes coupling a Static Random Access Memory (SRAM) to the processor.

6. A method for displaying data, comprising:
fetching frame buffer data by a processor from a Dynamic Random Access Memory (DRAM) and a first display driver is used to provide a display with the fetched frame buffer data in normal operation;
copying the frame buffer data stored in the DRAM to an SRAM embedded with the processor; and
refreshing the display using a second display driver that receives the copied frame buffer data stored in the SRAM embedded with the processor.

7. The method of claim 6 further comprising:
copying the frame buffer data stored in the DRAM to the SRAM prior to operating in the power savings mode.

8. The method of claim 6 further comprising:
powering down the DRAM and the first display driver in the power savings mode.

* * * * *